US010184059B2

(12) United States Patent
Han et al.

(10) Patent No.: US 10,184,059 B2
(45) Date of Patent: Jan. 22, 2019

(54) NANOMETAL-NANOCARBON HYBRID MATERIAL AND METHOD OF MANUFACTURING THE SAME

(71) Applicant: KOREA ELECTROTECHNOLOGY RESEARCH INSTITUTE, Changwon-si, Gyeongsangnam-do (KR)

(72) Inventors: Joong Tark Han, Changwon-si (KR); Geon Woong Lee, Changwon-si (KR); Jeong In Jang, Changwon-si (KR); Seung Yol Jeong, Gimhae-si (KR); Hee Jin Jeong, Changwon-si (KR); Seon Hee Seo, Changwon-si (KR)

(73) Assignee: Korea Electrotechnology Research Institute (KR)

(*) Notice: Subject to any disclaimer, the term of this patent is extended or adjusted under 35 U.S.C. 154(b) by 171 days.

(21) Appl. No.: 15/362,956

(22) Filed: Nov. 29, 2016

(65) Prior Publication Data

US 2017/0073817 A1    Mar. 16, 2017

Related U.S. Application Data

(63) Continuation of application No. PCT/KR2015/009789, filed on Sep. 17, 2015.

(30) Foreign Application Priority Data

Oct. 2, 2014  (KR) .................. 10-2014-0133501
Sep. 17, 2015  (KR) .................. 10-2015-0131322

(51) Int. Cl.
| | | |
|---|---|---|
| *C09D 11/52* | (2014.01) |
| *B22F 1/00* | (2006.01) |
| *B22F 1/02* | (2006.01) |
| *B22F 9/24* | (2006.01) |
| *C09C 1/48* | (2006.01) |
| *C01B 32/174* | (2017.01) |
| *C01B 32/194* | (2017.01) |

(52) U.S. Cl.
CPC ............ *C09D 11/52* (2013.01); *B22F 1/0025* (2013.01); *B22F 1/025* (2013.01); *B22F 9/24* (2013.01); *C01B 32/174* (2017.08); *C01B 32/194* (2017.08); *C09C 1/48* (2013.01); *B22F 2998/10* (2013.01); *B22F 2999/00* (2013.01)

(58) Field of Classification Search
CPC . C09D 11/52; B22F 1/025; B22F 9/24; B22F 1/0025; B22F 2999/00; B22F 2998/10; C09C 1/48; C01B 32/174; C01B 32/194
USPC ....... 252/503; 427/122, 123, 58, 126.5, 216, 427/217, 212
See application file for complete search history.

(56) References Cited

U.S. PATENT DOCUMENTS

| | | | | |
|---|---|---|---|---|
| 9,873,811 B2* | 1/2018 | Han | ...................... | H01B 1/04 |
| 2009/0004370 A1* | 1/2009 | Zurcher | ................ | C09D 11/38 |
| | | | | 427/123 |
| 2010/0035775 A1* | 2/2010 | Viswanathan | .......... | C01B 25/08 |
| | | | | 508/123 |
| 2016/0108271 A1* | 4/2016 | Wu | ........................ | C09D 11/03 |
| | | | | 427/125 |
| 2018/0230321 A1* | 8/2018 | Pan | ....................... | C09D 11/03 |

FOREIGN PATENT DOCUMENTS

| | | | |
|---|---|---|---|
| KR | 10-0961914 B1 | 6/2010 | |
| KR | 10-1355996 B1 | 1/2014 | |
| KR | 10-1410854 B1 | 6/2014 | |
| WO | WO-2015156562 A1 * | 10/2015 | ............... C09D 5/24 |

OTHER PUBLICATIONS

Translation of the Written Opinion of the International Searching Authority, PCT/KR2015/009789, 8 pages, dated Jan. 26, 2016. (Year: 2016).*
Sheng Zang et al., Carbon nanotubes decorated with Pt nanoparticles via electrostatic self-assembly: a high active oxygen reduction electrocatalyst, Journal of Materials Chemistry, Feb. 17, 2010, pp. 2826-2830, vol. 20-14.
Yi Jiang et al., Preparation and characterization of silver nanoparticles immobilized on multi-walled carbon nanotubes by poly(dopamine) functionalization, Journal of Nanoparticle Research, Jun. 8, 2012, pp. 1-10, vol. 14-6.
Joong Tark Han et al., Dispersant-free conducting pastes for flexible and printed nanocarbon electrodes, Nature Communications, Oct. 7, 2013, pp. 1-8, vol. 4.
Jong Seok Woo et al., Electrically robust metal nanowire network formation by in-situ interconnection with single-walled carbon nanotubes, Scientific Reports, Apr. 25, 2014, pp. 1-6, vol. 4.
International Search Report(PCT/KR2015/009789), WIPO, dated Jan. 26, 2016.

* cited by examiner

*Primary Examiner* — Douglas J McGinty
(74) *Attorney, Agent, or Firm* — Park & Associates IP Law, P.C.

(57) ABSTRACT

Disclosed are a nanometal-nanocarbon hybrid material and a method of manufacturing the same, the method including modifying the surface of nanocarbon to introduce a functional group to conductive nanocarbon; mixing the surface-modified nanocarbon with an isocyanate-based compound and a pyrimidine-based compound and allowing them to react, thus forming a nanocarbon dispersion reactive to metal ions; adding the nanocarbon dispersion with a metal salt precursor, a reducing agent and a solvent, thus manufacturing nanometal particles; and separating a hybrid of the nanometal particles having the nanocarbon bound thereto. Thereby, nanocarbon is mixed with an isocyanate-based compound and a pyrimidine-based compound and then allowed to react, whereby the nanocarbon reactive with metal ions is used as an additive, thus obtaining a nanometal having a low-dimensional shape having less than three dimensions. Also, a nanometal can be hybridized with nanocarbon simultaneously with the formation of the nanometal, and solvent dispersibility is ensured by a functional group formed by mixing and reacting an isocyanate-based compound and a pyrimidine-based compound, ultimately facilitating the preparation of conductive ink or paste.

9 Claims, 4 Drawing Sheets

NANOMETAL-NANOCARBON HYBRID MATERIAL AND METHOD OF MANUFACTURING THE SAME

REFERENCE TO RELATED APPLICATIONS

This is a continuation of International Patent Application PCT/KR2015/009789 filed on Sep. 17, 2015, which designates the United States and claims priority of Korean Patent Application No. 10-2014-0133501 filed on Oct. 2, 2014, and Korean Patent Application No. 10-2015-0131322 filed on Sep. 17, 2015, the entire contents of which are incorporated herein by reference.

FIELD OF THE INVENTION

The present invention relates to a nanometal-nanocarbon hybrid material and a method of manufacturing the same and, more particularly, to a nanometal-nanocarbon hybrid material and a method of manufacturing the same, wherein nanocarbon is mixed with an isocyanate-based compound and a pyrimidine-based compound and then allowed to react, whereby the nanocarbon, which is reactive with metal ions, is used as an additive, thus making it possible to manufacture metal particles having a so-called low-dimensional shape, having less than three dimensions, and high dispersibility.

BACKGROUND OF THE INVENTION

Typically, conductive nanocarbon, such as carbon nanotubes (CNT), graphene, and carbon fiber, is applicable in a variety of fields, including electrode materials for transparent electrodes, antistatic devices, electromagnetic wave-shielding devices and energy generation/storage devices, heat-dissipating materials, polymer composites, metal composites, ceramic composites, and conductive fibers. In order to coat nanocarbon or manufacture a nanocarbon fiber, a coating solution or spinning dope in the form of a high-viscosity paste or a diluted solution is required.

To prepare a coating solution or paste, a dispersant such as a surfactant, a copolymer, or an ionic liquid is essentially used. In the case where an excess amount of a functional group is introduced to the surface of a material, the dispersal process is easy but conductivity may decrease. Thus, in the case where a conductive coating solution or paste is prepared using conductive nanocarbon while maintaining conductivity without the use of a dispersant, the manufacturing cost may be decreased, and moreover, the manufacturing process may be simplified. Furthermore, combination thereof with any kind of binder, metal and metal oxide is possible because the dispersant is obviated.

There have been reported techniques for introducing metal particles to increase the electrical conductivity of nanocarbon. With regard to conventional techniques for hybridizing nanocarbon with a nanometal, Korean Patent No. 10-1410854 discloses a highly conductive material formed by hybridizing a nanometal with a nanocarbon material having a higher-order structure due to the presence of multiple hydrogen bonds, and a method of manufacturing the same. In this technique, conductive nanocarbon is introduced with a functional group that enables the formation of multiple hydrogen bonds, thus forming a nanocarbon material having a higher-order structure via multiple hydrogen bonds therein, and the nanocarbon material having the higher-order structure is simply mixed with a nanometal, resulting in a hybrid material. This conventional technique exhibits high dispersibility but is problematic because the nanocarbon and the nanometal are individually distributed due to the bonding properties thereof and thus superior metal properties are difficult to manifest.

In addition, Korean Patent No. 10-0961914 discloses a method of manufacturing a carbon nanotube nanocomposite coated with silver nanoparticles. This method includes a first step of preparing a carbon nanotube dispersion by dispersing carbon nanotubes in an organic solvent, a second step of attaching silver nanoparticles to the surface of the carbon nanotubes by mixing the carbon nanotube dispersion with a solution including silver ions, and a third step of subjecting the product of the second step to centrifugation and washing. In this technique, silver ions are reduced into silver particles in the presence of carbon nanotubes to form a composite of silver nanoparticles and carbon nanotubes, but the silver particles are configured such that spherical nanoparticles are not continuously formed, making it difficult to apply such a composite to highly conductive electrodes. Moreover, since the functional group of the carbon nanotubes has silver particles introduced thereto, the dispersibility of the composite is remarkably decreased in the solvent after the introduction of silver particles, and thus, an additional dispersant has to be used, which is undesirable.

SUMMARY OF THE INVENTION

Accordingly, the present invention is intended to provide a nanometal-nanocarbon hybrid material and a method of manufacturing the same, wherein nanocarbon is mixed with an isocyanate-based compound and a pyrimidine-based compound and then allowed to react, whereby the nanocarbon, which is reactive with metal ions, is used as an additive, thus making it possible to manufacture metal particles having a low-dimensional shape, having less than three dimensions, and high dispersibility.

The present invention provides a method of manufacturing a nanometal-nanocarbon hybrid material, comprising: modifying the surface of nanocarbon to introduce a functional group to conductive nanocarbon, thus obtaining a surface-modified nanocarbon, mixing the surface-modified nanocarbon with an isocyanate-based compound and a pyrimidine-based compound and allowing them to react, thus forming a nanocarbon dispersion that is reactive to metal ions, adding the nanocarbon dispersion with a metal salt precursor, a reducing agent and a solvent, thus manufacturing nanometal particles, and separating a hybrid of the nanometal particles having the nanocarbon bound thereto.

The nanocarbon is preferably selected from the group consisting of carbon nanotubes (CNT), carbon fiber, graphene, carbon black, and mixtures thereof.

The metal salt precursor is selected from the group consisting of a gold (Au) salt precursor, a silver (Ag) salt precursor, a platinum (Pt) salt precursor, a copper (Cu) salt precursor, an aluminum (Al) salt precursor, a palladium (Pd) salt precursor, a nickel (Ni) salt precursor, and mixtures thereof. The silver salt precursor is selected from the group consisting of silver nitrate ($AgNO_3$), silver perchlorate ($AgClO_4$), silver tetrafluoroborate ($AgBF_4$), silver hexafluorophosphate ($AgPF_6$), silver acetate ($CH_3COOAg$), silver trifluoromethanesulfonate ($AgCF_3SO_3$), silver sulfate ($Ag_2SO_4$), silver 2,4-pentanedionate ($CH_3COCH=COCH_3Ag$), and mixtures thereof, and the platinum salt precursor is selected from the group consisting of chlorotetraamine platinum ($Pt(NH_3)_4Cl_2$), dichlorotetraamine platinum hydrate ($Pt(NH_3)_4Cl_2 \cdot xH_2O$), tetraamine platinum hydroxide hydrate ($Pt(NH_3)_4(OH)_2 \cdot xH_2O$), tetraamine platinum (II) nitrate ($Pt(NH_3)_4(NO_3)_2$), bis-ethylene diamine platinum (II) chloride (($H_2NCH_2CH_2NH_2)_2PtCl_2$), chloroplatinic acid ($[H_3O]_2[PtCl_6](H_2O)_x$ or $H_2PtCl_6$), and mixtures thereof.

In addition, the present invention provides a nanometal-nanocarbon hybrid material, comprising nanocarbon, which is reactive with metal ions, and a nanometal, which is coupled with the nanocarbon by a metal precursor including metal ions so as to react with the nanocarbon.

According to the present invention, nanocarbon is mixed with an isocyanate-based compound and a pyrimidine-based compound and allowed to react, and thus the nanocarbon reactive with metal ions is useful as an additive, thereby obtaining a nanometal having a low-dimensional shape, that is, having less than three dimensions.

Furthermore, a nanometal can be hybridized with nanocarbon simultaneously with the formation of the nanometal, and solvent dispersibility is ensured by means of a functional group formed by mixing an isocyanate-based compound and a pyrimidine-based compound and allowing them to react, ultimately facilitating the preparation of conductive ink or paste.

DETAILED DESCRIPTION OF THE INVENTION

Hereinafter, a detailed description will be given of a nanometal-nanocarbon hybrid material and a method of manufacturing the same, according to embodiments of the present invention, with reference to the appended drawings.

In the present invention, the term "nanometal-nanocarbon hybrid material" indicates a hybrid of nanometal particles having nanocarbon bound thereto through the reaction of nanocarbon, which is reactive with metal ions, and a metal precursor. The nanometal-nanocarbon hybrid material is composed of nanocarbon that is reactive with metal ions and a nanometal that is bound to the nanocarbon by a metal precursor including metal ions so as to react with the nanocarbon.

Figure 1:
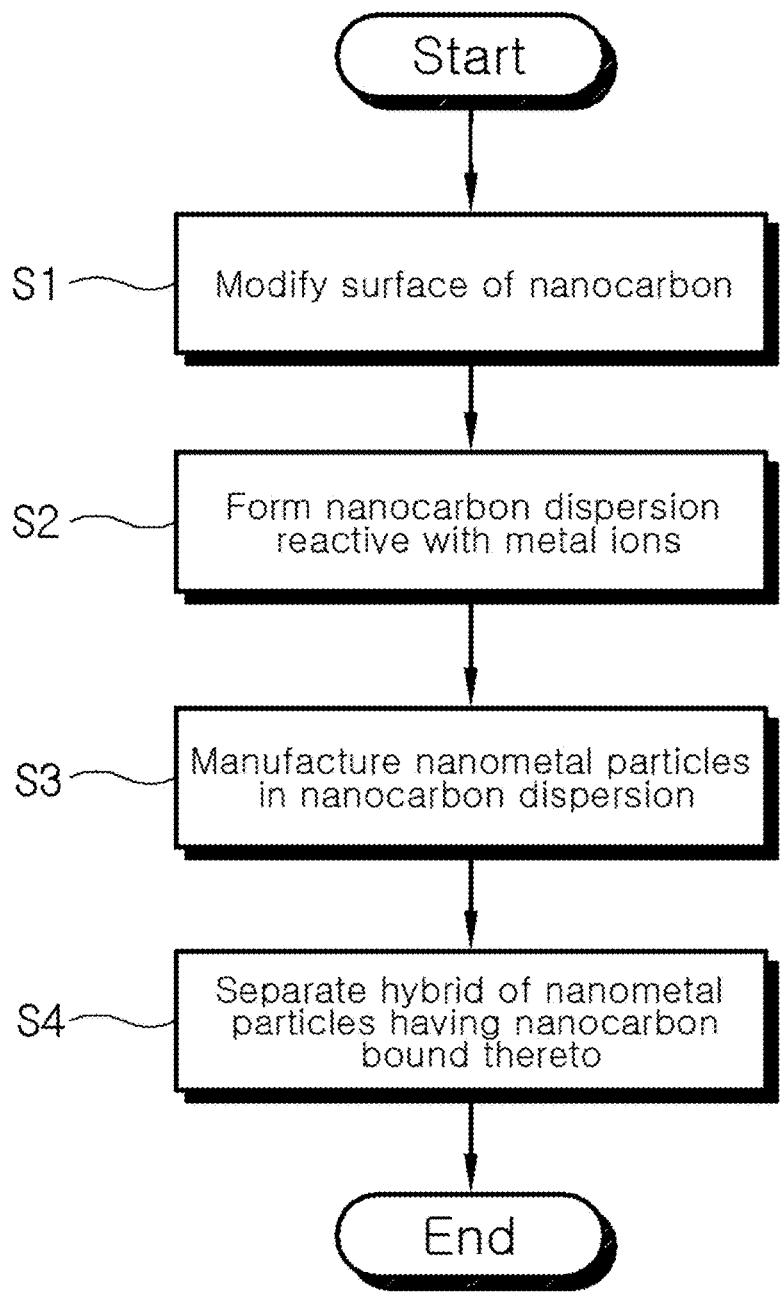
FIG. 1 is a flowchart showing a process of manufacturing a nanometal-nanocarbon hybrid material according to an embodiment of the present invention.

As shown in FIG. 1, the method of manufacturing the nanometal-nanocarbon hybrid material includes modifying the surface of nanocarbon (S1).

In order to introduce a functional group that reacts with a metal precursor to the nanocarbon, the surface of the nanocarbon is modified. Modifying the surface of the nanocarbon may be variously performed depending on the kind of nanocarbon. As such, the nanocarbon is selected from the group consisting of graphene, carbon nanotubes (CNT), carbon fiber, carbon black, and mixtures thereof.

Next, a nanocarbon dispersion, which is reactive with metal ions, is formed (S2).

The surface-modified nanocarbon is mixed with an isocyanate-based compound and a pyrimidine-based compound and allowed to react, thereby forming the nanocarbon dispersion that is reactive with metal ions. As such, the nanocarbon dispersion is formed as follows: the nanocarbon is dispersed in a solvent, mixed with the isocyanate-based compound, heated and stirred to thus introduce the isocyanate group to the nanocarbon, additionally mixed with the pyrimidine-based compound, and heated and stirred to carry out a coupling reaction, thereby forming the nanocarbon dispersion that is reactive with metal ions.

The isocyanate-based compound is preferably selected from the group consisting of ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 1,4-durol diisocyanate (DDI), 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), naphthalene-1,5-isocyanate (NDI), 2,2-methylenediphenyl diisocyanate, 5,7-diisocyanatonaphthalene-1,4-dione, isophorone diisocyanate, m-xylene diisocyanate, 3,3-dimethoxy-4,4-biphenylene diisocyanate, 3,3-dimethoxybenzidine-4,4-diisocyanate, toluene 2,4-diisocyanate terminal-having poly(propylene glycol), toluene 2,4-diisocyanate terminal-having poly(ethylene glycol), triphenylmethane triisocyanate, diphenylmethane triisocyanate, butane-1,2,2-triisocyanate, trimethylolpropane tolylene diisocyanate trimer, 2,4,4-diphenyl ether triisocyanate, isocyanurate having a plurality of hexamethylene diisocyanates, iminooxadiazine having a plurality of hexamethylene diisocyanates, polymethylene polyphenyl isocyanate, and mixtures thereof.

Also, the pyrimidine-based compound is preferably selected from the group consisting of 2-amino-6-methyl-1H-pyrido[2,3-d]pyrimidin-4-one, 2-amino-6-bromopyrido[2,3-d]pyridin-4(3H)-one, 2-amino-4-hydroxy-5-pyrimidine carboxylic acid ethyl ester, 2-amino-6-ethyl-4-hydroxypyrimidine, 2-amino-4-hydroxy-6-methyl pyrimidine, 2-amino-5,6-dimethyl-4-hydroxy pyrimidine, and mixtures thereof.

The nanocarbon is preferably contained in an amount of 0.001 to 10 parts by weight based on 100 parts by weight of the dispersion. If the amount of the nanocarbon is less than 0.001 parts by weight, it is impossible to obtain nanometal particles having a uniform diameter due to the small amount of the nanocarbon that is used. On the other hand, if the amount thereof exceeds 10 parts by weight, the amount of the nanocarbon is large relative to the amount of nanometal particles that are formed, making it difficult to apply the resulting hybrid material to various end uses.

Next, the nanometal particles in the nanocarbon dispersion are prepared (S3).

The nanocarbon dispersion is added with a metal salt precursor, a reducing agent and a solvent to prepare nanometal particles. Any nanometal particles may be used without limitation, so long as they are manufactured using a precursor of gold (Au), silver (Ag), platinum (Pt), copper (Cu), aluminum (Al), palladium (Pd), and nickel (Ni).

Specifically, a silver precursor for manufacturing silver nanometal particles is preferably selected from the group consisting of silver nitrate ($AgNO_3$), silver perchlorate ($AgClO_4$), silver tetrafluoroborate ($AgBF_4$), silver hexafluorophosphate ($AgPF_6$), silver acetate ($CH_3COOAg$), silver trifluoromethanesulfonate ($AgCF_3SO_3$), silver sulfate ($Ag_2SO_4$), silver 2,4-pentanedionate ($CH_3COCH=COCH_3Ag$), and mixtures thereof.

A platinum precursor for manufacturing platinum nanometal particles is preferably selected from the group consisting of chlorotetraamine platinum ($Pt(NH_3)_4Cl_2$), dichlorotetraamine platinum hydrate ($Pt(NH_3)_4Cl_2.xH_2O$), tetraamine platinum hydroxide hydrate ($Pt(NH_3)_4(OH)_2.xH_2O$), tetraamine platinum (II) nitrate ($Pt(NH_3)_4(NO_3)_2$), bis-ethylene diamine platinum (II) chloride (($H_2NCH_2CH_2NH_2)_2PtCl_2$), chloroplatinic acid ($[H_3O]_2[PtCl_6](H_2O)_x$ or $H_2PtCl_6$), and mixtures thereof.

The reducing agent is preferably selected from the group consisting of sodium hydroxide (NaOH), potassium hydroxide (KOH), ammonium hydroxide ($NH_4OH$), sodium borohydride ($NaBH_4$), hydrazine ($N_2H_4$), hydriodide (HI), ascorbic acid, a reducible organic solvent, and mixtures thereof.

Next, the hybrid of nanometal particles having the nanocarbon bound thereto is separated (S4).

From the reducing agent and the solvent, which participate in the reaction, the hybrid of nanometal particles having the nanocarbon bound thereto is separated, thereby yielding a nanometal-nanocarbon hybrid material in isolation.

In the method of manufacturing the hybrid of nanometal particles and nanocarbon as described above, the nanocarbon is introduced with a functional group that is able to interact with metal ions or nanometal particles, and the functional group-introduced nanocarbon is added upon the synthesis of nanometal particles so that the shape of the nanometal particles is controlled to a low-dimensional shape having less than three dimensions, that is, a one- or two-dimensional shape.

Example 1

Carbon nanotubes, serving as nanocarbon, were introduced with a functional group able to interact with silver ions or silver particles, and the functional group-introduced carbon nanotubes were added upon the synthesis of silver particles so as to control the shape of the silver particles.

Specifically, 10 g of multi-walled carbon nanotubes was prepared. 10 g of the multi-walled carbon nanotubes was mixed with 200 ml of a mixture comprising sulfuric acid and nitric acid (at a volume ratio of 7:3), heated to 80° C., stirred for 24 hr, cooled to room temperature, and then diluted with 800 ml of distilled water. Thereafter, the diluted solution was filtered four or more times using filter paper, thus removing the acid solution from the carbon nanotubes, followed by drying, thus obtaining carboxyl group (—COOH)-introduced multi-walled carbon nanotubes.

Figure 2:
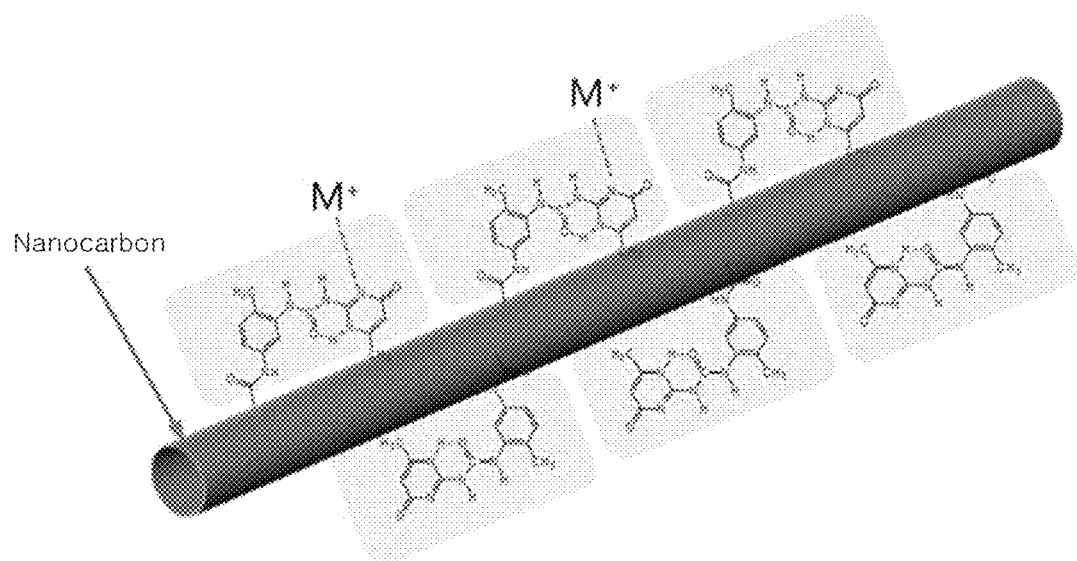
FIG. 2 schematically shows the nanometal-nanocarbon hybrid material.

The carboxyl group-introduced carbon nanotubes were dispersed at 100 mg/L in a dimethylformamide solvent, mixed with toluene diisocyanate, and allowed to react with stirring at 100° C. for 12 hr to thereby introduce an isocyanate group. Thereafter, the isocyanate group-introduced carbon nanotubes were mixed with 2-amino-4-hydroxy-6-methyl pyrimidine and allowed to carry out a coupling reaction with stirring at 100° C. for 20 hr, thus introducing 2-ureido-4[1H]pyrimidinone having quadruple hydrogen bonds, as shown in FIG. 2.

The functional group-introduced carbon nanotubes thus obtained were dispersed at 2 g/L in a dimethylformamide solvent and added with 0.05 mol/L of silver nitrate ($AgNO_3$), thus preparing a silver salt-mixed solution. The mixed solution was uniformly dispersed for 5 min using a sonicator, added with hydrazine as a reducing agent, and stirred at 100° C. for 1 hr, thus manufacturing silver particles.

Then, the silver particles dispersed in the solvent, hybridized with the nanocarbon, were subjected to centrifugation or filtration to remove the solvent, thereby yielding silver particles hybridized with carbon nanotubes.

Example 2

Example 2 was performed in the same manner as in Example 1 of the present invention, with the exception that the functional group-introduced carbon nanotubes were dispersed at 3 g/L in a dimethylformamide solvent, thereby yielding silver particles hybridized with carbon nanotubes.

Figure 3:
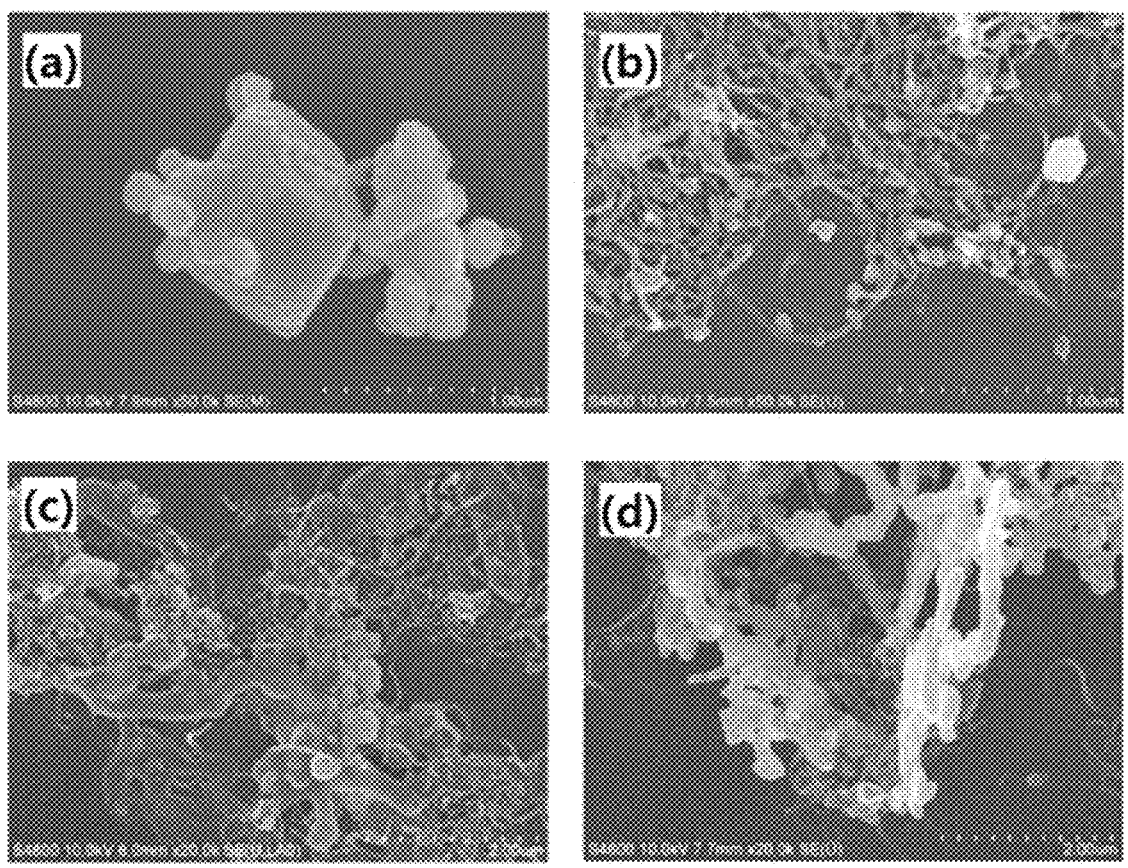
FIG. 3 is of scanning electronic microscope (SEM) images showing the hybridization of nanocarbon with silver particles according to Examples and Comparative Examples.

As shown in FIGS. 3c and 3d, the silver particles hybridized with carbon nanotubes obtained in Examples 1 and 2 of the present invention had a one-dimensional shape, in which silver particles were applied on the surface of the carbon nanotubes, or a planar two-dimensional shape, in which carbon nanotubes were connected by silver particles. In this way, the silver particles can be seen to be efficiently coupled with the carbon nanotubes in the form of a linear or planar structure, in lieu of a three-dimensional shape.

Example 3

As in Example 1, the shape of silver particles was controlled by adding carbon nanotubes, having a functional group able to interact with silver ions or silver particles, to a silver salt. Specifically, silver nitrate ($AgNO_3$) was added in an amount of 0.5 mol/L to prepare a silver salt precursor-mixed solution. The mixed solution was uniformly dispersed for 5 min using a sonicator, added with hydrazine as a reducing agent, and stirred at 100° C. for 1 hr, thus manufacturing silver particles. Then, the silver particles dispersed in the solvent, hybridized with the nanocarbon, were subjected to centrifugation or filtration to remove the solvent, thereby yielding silver particles hybridized with carbon nanotubes.

Example 3 was performed in the same manner as Example 1, with the exception that silver nitrate ($AgNO_3$) was added in an amount of 0.5 mol/L. The silver particles hybridized with carbon nanotubes were configured such that the concentration of the silver particles was increased, but the shape thereof was similar to that of Example 1.

Example 4

As in Example 2, the shape of the silver particles was controlled by adding carbon nanotubes, having a functional group able to interact with silver ions or silver particles, to a silver salt. Specifically, silver nitrate ($AgNO_3$) was added in an amount of 0.3 mol/L to prepare a silver salt-mixed solution. The mixed solution was uniformly dispersed for 5 min using a sonicator, added with hydrazine as a reducing agent, and stirred at 100° C. for 1 hr, thus manufacturing silver particles. Then, the silver particles dispersed in the solvent, hybridized with the nanocarbon, were subjected to centrifugation or filtration to remove the solvent, thereby yielding silver particles hybridized with carbon nanotubes.

Example 4 was performed in the same manner as Example 2, with the exception that silver nitrate ($AgNO_3$) was added in an amount of 0.3 mol/L. The silver particles hybridized with carbon nanotubes were configured such that the concentration of the silver particles was increased, but the shape thereof was similar to that of Example 1.

Example 5

Figure 4:
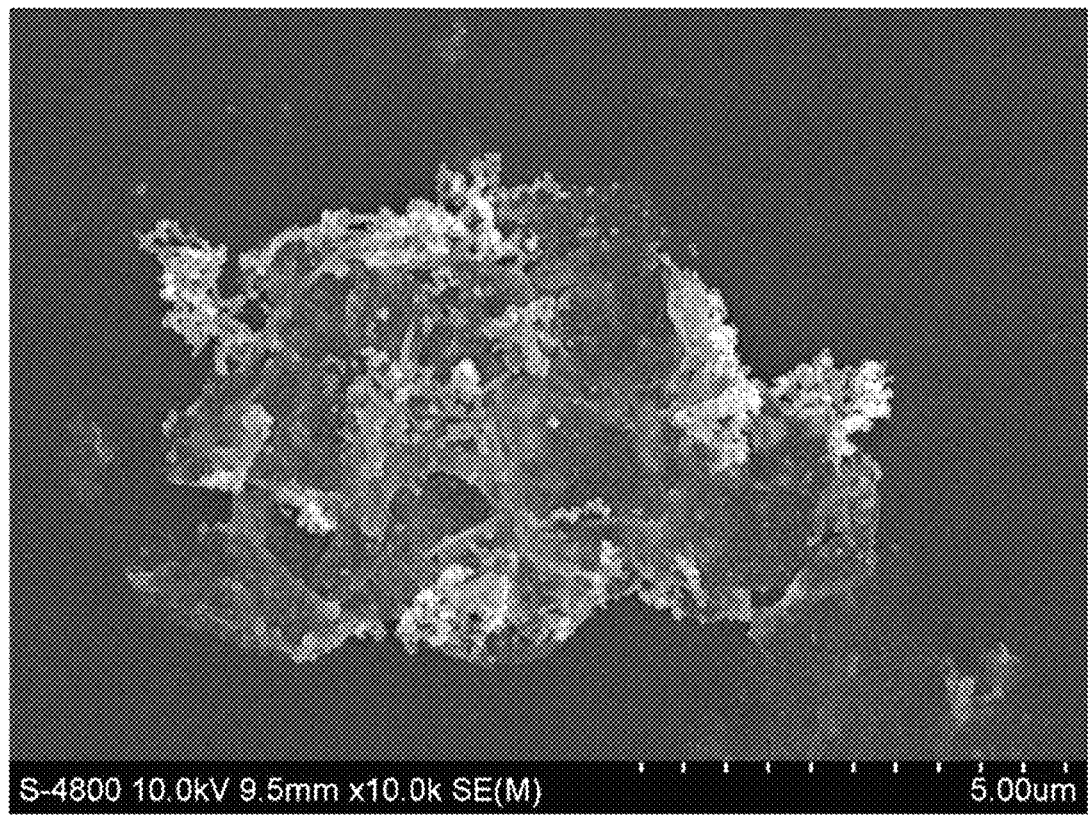
FIG. 4 is an SEM image showing the hybridization of nanocarbon and platinum according to an Example.

As in Example 1, graphene particles having a functional group able to interact with platinum ions or platinum particles were dispersed in a dimethylformamide solvent and added with a platinum precursor to yield a hybrid of platinum nanoparticles and graphene. Specifically, as in Example 1, 1 g/L of a functionalized graphene solution, obtained by sequentially reacting graphene with an isocyanate-based compound and a pyrimidine-based compound, was added with 0.5 mol/L of $H_2PtCl_6$, thus preparing a mixed solution. This mixed solution was uniformly dispersed for 5 min using a sonicator, added with hydrazine as a reducing agent, and stirred at 70° C. for 5 hr, thereby manufacturing a platinum-graphene hybrid material as shown in FIG. 4.

Comparative Examples of the present invention are described below.

Comparative Example 1

In Comparative Example 1, carbon nanotubes as an additive were not used when manufacturing silver particles using a process of reducing a silver salt solution.

A silver salt solution was prepared using 0.05 mol/L of silver nitrate in dimethylformamide, added with hydrazine as a reducing agent, and stirred at 100° C. for 1 hr, thus manufacturing silver particles. As shown in FIG. 3a, in the case where no additive was used, silver particles having a typical spherical shape were obtained, and a hybrid material having the desired shape was not manufactured.

Comparative Example 2

In Comparative Example 2, carbon nanotubes were introduced only with a carboxyl group using an acid mixture of sulfuric acid and nitric acid, 2 g/L thereof was added to 0.05 mol/L of a silver salt-mixed solution, and the mixed solution was added with hydrazine as a reducing agent and was then stirred at 100° C. for 1 hr, thus manufacturing silver particles. As shown in FIG. 3b, the resulting silver particles were configured such that some of the silver nanoparticles were attached in a spherical arrangement only to the surface of the carbon nanotubes, and a hybrid material having the desired shape was not manufactured.

What is claimed is:

1. A method of manufacturing a nanometal-nanocarbon hybrid material, comprising:
   modifying a surface of a nanocarbon to introduce a functional group to a conductive nanocarbon, thus obtaining a surface-modified nanocarbon;
   mixing the surface-modified nanocarbon with an isocyanate-based compound and a pyrimidine-based compound and allowing them to react, thus forming a nanocarbon dispersion that is reactive to metal ions;
   adding the nanocarbon dispersion with a metal salt precursor, a reducing agent and a solvent, thus manufacturing nanometal particles; and
   separating a hybrid of the nanometal particles having the nanocarbon bound thereto.

2. The method of claim 1, wherein the nanocarbon is selected from the group consisting of carbon nanotubes (CNT), carbon fiber, graphene, carbon black, and mixtures thereof.

3. The method of claim 1, wherein the isocyanate-based compound comprises at least one selected from the group consisting of ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 1,4-durol diisocyanate (DDI), 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), naphthalene-1,5-isocyanate (NDI), 2,2-methylenediphenyl diisocyanate, 5,7-diisocyanatonaphthalene-1,4-dione, isophorone diisocyanate, m-xylene diisocyanate, 3,3-dimethoxy-4,4-biphenylene diisocyanate, 3,3-dimethoxybenzidine-4,4-diisocyanate, toluene 2,4-diisocyanate terminal-having poly(propylene glycol), toluene 2,4-diisocyanate terminal-having poly (ethylene glycol), triphenylmethane triisocyanate, diphenylmethane triisocyanate, butane-1,2,2-triisocyanate, trimethylolpropane tolylene diisocyanate trimer, 2,4,4-diphenyl ether triisocyanate, isocyanurate having a plurality of hexamethylene diisocyanates, iminooxadiazine having a plurality of hexamethylene diisocyanates, and polymethylene polyphenyl isocyanate.

4. The method of claim 1, wherein the pyrimidine-based compound comprises at least one selected from the group consisting of 2-amino-6-methyl-1H-pyrido[2,3-d]pyrimidin-4-one, 2-amino-6-bromopyrido[2,3-d]pyridin-4(3H)-one, 2-amino-4-hydroxy-5-pyrimidine carboxylic acid ethyl ester, 2-amino-6-ethyl-4-hydroxypyrimidine, 2-amino-4-hydroxy-6-methyl pyrimidine, and 2-amino-5,6-dimethyl-4-hydroxy pyrimidine.

5. The method of claim 1, wherein the metal salt precursor is selected from the group consisting of a gold (Au) salt precursor, a silver (Ag) salt precursor, a platinum (Pt) salt precursor, a copper (Cu) salt precursor, an aluminum (Al) salt precursor, a palladium (Pd) salt precursor, a nickel (Ni) salt precursor, and mixtures thereof.

6. The method of claim 5, wherein the silver salt precursor is selected from the group consisting of silver nitrate ($AgNO_3$), silver perchlorate ($AgClO_4$), silver tetrafluoroborate ($AgBF_4$), silver hexafluorophosphate ($AgPF_6$), silver acetate ($CH_3COOAg$), silver trifluoromethanesulfonate ($AgCF_3SO_3$), silver sulfate ($Ag_2SO_4$), silver 2,4-pentanedionate ($CH_3COCH=COCH_3Ag$), and mixtures thereof.

7. The method of claim 5, wherein the platinum salt precursor is selected from the group consisting of chlorotetraamine platinum ($Pt(NH_3)_4Cl_2$), dichlorotetraamine platinum hydrate ($Pt(NH_3)_4Cl_2 \cdot xH_2O$), tetraamine platinum hydroxide hydrate ($Pt(NH_3)_4(OH)_2 \cdot xH_2O$), tetraamine platinum (II) nitrate ($Pt(NH_3)_4(NO_3)_2$), bis-ethylene diamine platinum (II) chloride (($H_2NCH_2CH_2NH_2)_2PtCl_2$), chloroplatinic acid ($[H_3O]_2[PtCl_6](H_2O)_x$ or $H_2PtCl_6$), and mixtures thereof.

8. The method of claim 1, wherein the reducing agent is selected from the group consisting of sodium hydroxide (NaOH), potassium hydroxide (KOH), ammonium hydroxide ($NH_4OH$), sodium borohydride ($NaBH_4$), hydrazine ($N_2H_4$), hydriodide (HI), ascorbic acid, a reducible organic solvent, and mixtures thereof.

9. The method of claim 1, wherein the nanocarbon is contained in an amount of 0.001 to 10 parts by weight based on 100 parts by weight of the dispersion.

* * * * *